Feb. 14, 1933.   M. FLECK   1,897,554
GATE
Filed Nov. 19, 1930   5 Sheets-Sheet 1
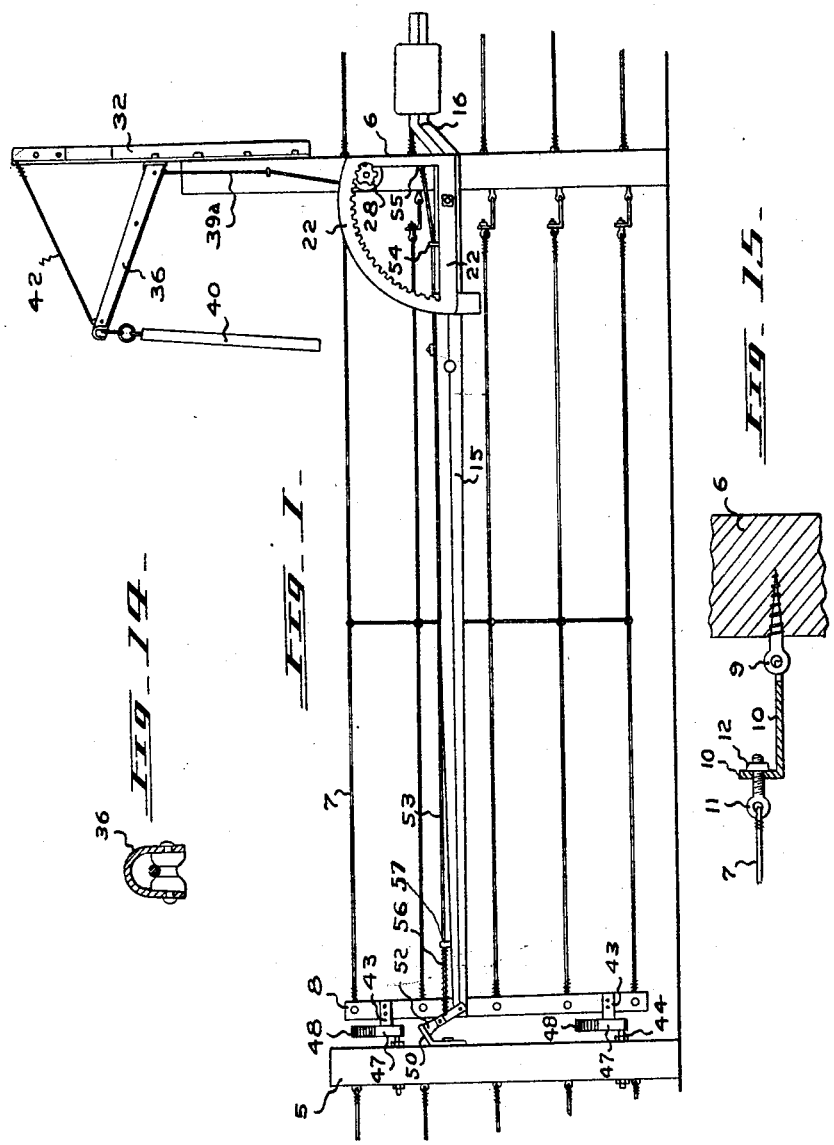
INVENTOR
Mathias Fleck
By Ralph Burch
Attorney

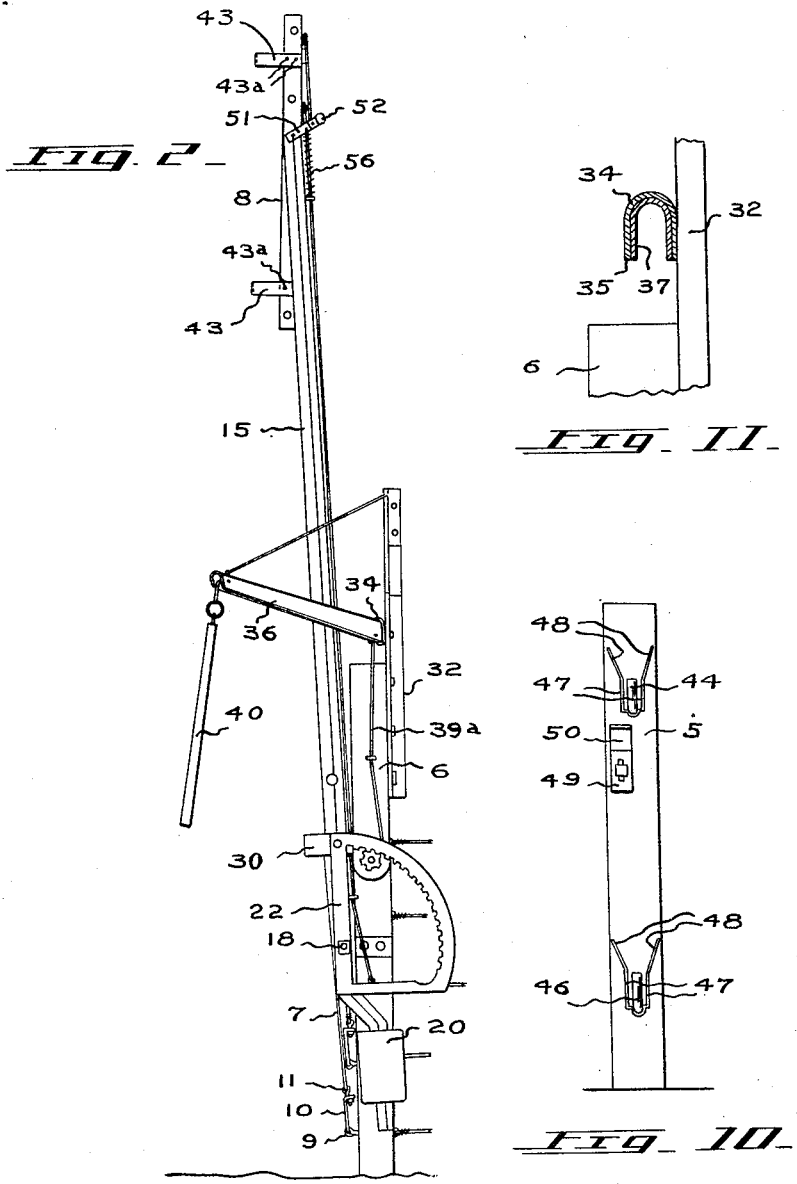

Feb. 14, 1933.                M. FLECK                1,897,554
                               GATE
                        Filed Nov. 19, 1930          5 Sheets-Sheet 3
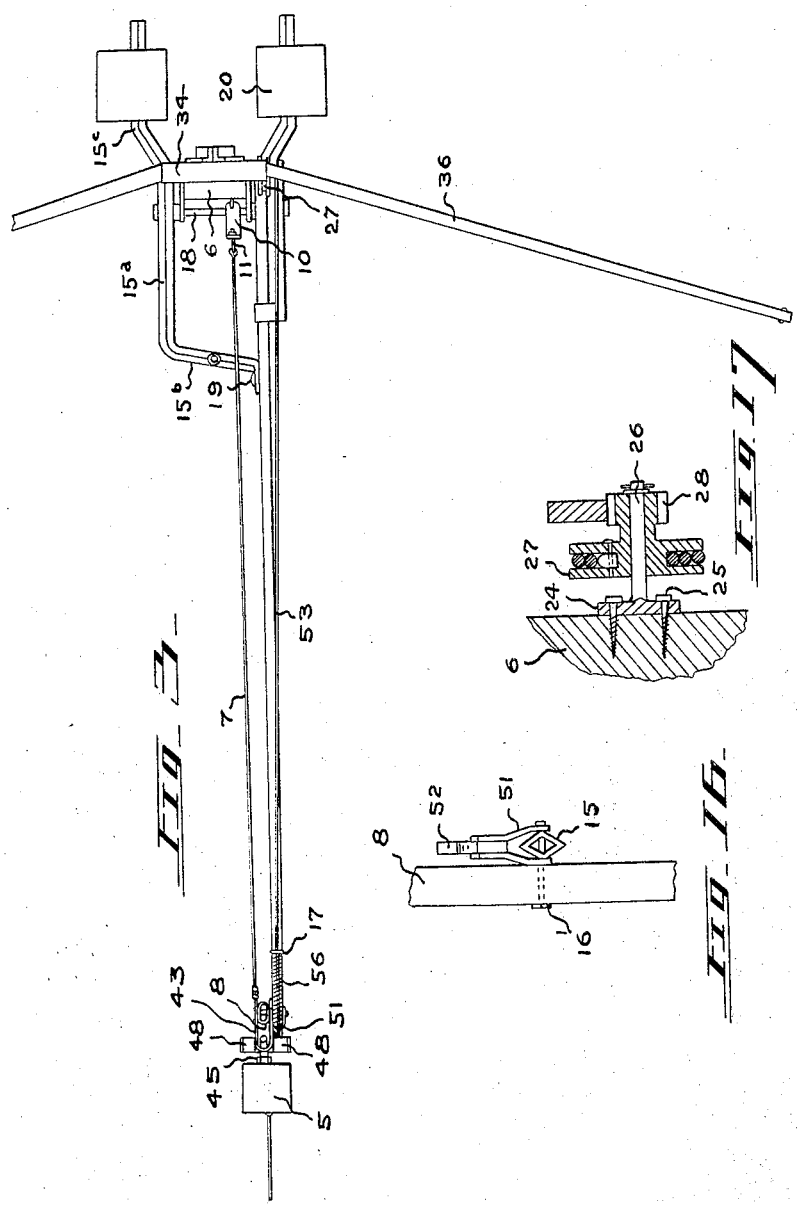
INVENTOR
Mathias Fleck
By Ralph Burch
Attorney

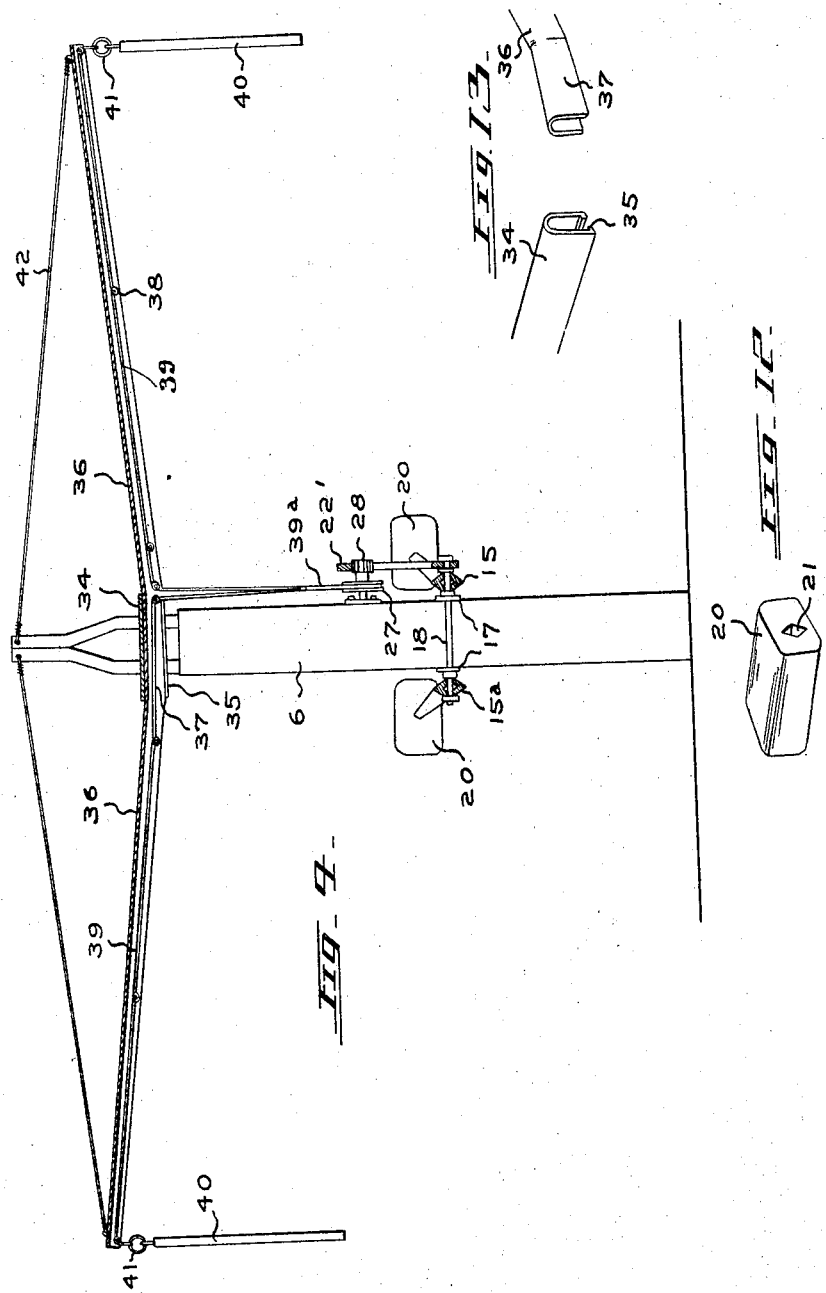

Feb. 14, 1933.  M. FLECK  1,897,554
GATE
Filed Nov. 19, 1930  5 Sheets-Sheet 5
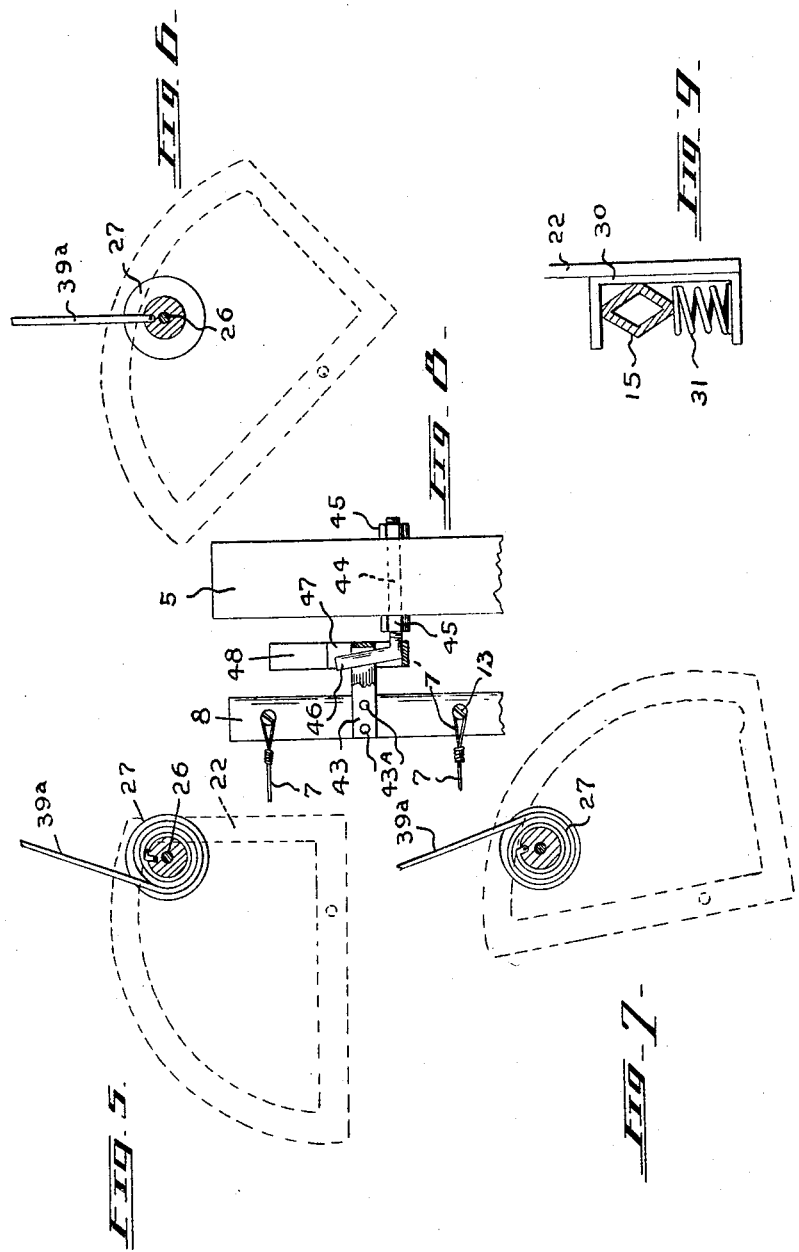
INVENTOR
Mathias Fleck
By Ralph Burch
Attorney Patented Feb. 14, 1933

1,897,554

UNITED STATES PATENT OFFICE

MATHIAS FLECK, OF TORQUAY, SASKATCHEWAN, CANADA

GATE

Application filed November 19, 1930. Serial No. 496,732.

This invention relates broadly to gates, and has as its primary object the provision of certain new and novel improvements in farm gates, the invention consisting broadly in the provision of a farm gate swingable vertically for movement to an open or closed position and having means associated therewith whereby the gate may be controlled by one on either side of the gate and remote from the gate.

Further objects lie in the tensile principle of construction embodied in this gate, which yields a maximum of rigidity, together with a minimum weight of construction.

Other objects reside in the construction of a gate of the character described, which is rigid in construction, inexpensive to manufacture and simple to operate, positive in action and a general improvement in the art.

Other objects and many of the attendant advantages, will become more apparent from a consideration of the illustrative embodiment of this invention, for which purpose the accompanying drawings have been hereto appended, wherein:

Figure 1 is a side elevational view of my gate the same being shown in a lowered or closed position.

Figure 2 is a similar view showing the gate in a raised or opened position.

Figure 3 is a top plan view of the gate in closed position.

Figure 4 is an end view partly in section and partly in elevation of my improved gate structure.

Figure 5 is a detail clamp partly in section for illustrating the position of the rack segment when the gate is in lowered position.

Figure 6 is a similar view showing the position of the rack segment when the gate is in a partially opened position.

Figure 7 is a similar view showing the position of the rack bar with the gate in a fully opened or vertical position.

Figure 8 is a fragmentary detail view partly in section and partly in elevation illustrating certain details of structure to be hereinafter more specifically referred to.

Figure 9 is a fragmentary detail view partly in section and partly in elevation illustrative of the resilient connection between the horizontally disposed gate bar and the rack spring.

Figure 10 is an elevational view of the stationary fence post for more clearly illustrating the catch members mounted thereon.

Figure 11 is a fragmentary view partly in section and partly in elevation for clearly illustrating the manner of assembling the cable guide arms to the riser on the elongated fence post forming the stationary post of the gate.

Figure 12 is a perspective view of one of the weight members.

Figure 13 is a fragmentary detail perspective for clearly illustrating the manner of assembling the cable guide arms to the sleeve connection.

Figure 14 is a transverse sectional view taken through one of the cable guide arms showing the guide pulley mounted therein.

Figure 15 is a fragmentary detail view partly in section and partly in elevation illustrative of the adjustable connection between the wires of the gate and the elongated fence post forming the stationary post of the gate.

Figure 16 is a fragmentary detail elevational view illustrative of the manner of pivotally securing the spring actuated latch to the forward end of the tubular gate bar.

Figure 17 is a fragmentary detail sectional view through the cable drum and pinion associated therewith.

With reference more in detail to the drawings, it will be seen that the reference character 5 designates one stationary fence post while the reference character 6 designates a second fence post disposed in space apart relation with the fence post 5 and has its upper end extending above the upper end of the post 5. The gate per se comprises a plurality of spaced wires 7 adjustably connected at one end to the post 6 and connected together at the opposite end through the medium of a tubular end bar 8.

The adjustable connecting means between the gate wires 7 and the post 6 consists of an eye bolt 9 threaded in the post 6, and L-strap 10 one end of which is provided with an aperture for receiving the eye of the eye bolt 9. To the end of the fence wire 7 is suitably secured an eye bolt 11 the shank of which is passed through an aperture in the vertically disposed flange 10' of the L-strap 10 and has a nut 12 threaded thereon.

The gate wires 7 are secured at their opposite end to the end post 8 of the gate in a manner shown in Figure 15 wherein it will be seen that each wire 7 at said end is suitably formed to provide an eye 7' through which passes a pin 13 extending transversely of the gate member 8. Obviously, by adjusting the eye bolt 11 the gate wires 7 may be readily and easily tightened or tensioned when necessary. Furthermore, it will be noted that the connection between the L-strap 10 and the eye screw 9 provides a pivotal connection whereby the gate, in a manner to be hereinafter more fully set forth may be swung to an open and closed position or from a horizontal to a substantial vertical position with the gate in the open or vertical position being substantially collapsed. (See Figure 2).

An elongated tubular bar 15 tapers longitudinally and at its largest end is offset laterally and then continues longitudinally as at 16. The tubular bar 15 is somewhat in the nature of a brace bar for the gate and is substantially diamondshape in cross section. The bar 15 extends longitudinally of the gate, and as shown to advantage in Figure 16 a pivot bolt 16' extends through the end gate member 8 and projects laterally of the member 8 to extend through the smallest end of the tube 15.

Horizontally disposed bracket arms 17 are suitably secured one to each side of the post 6 and extend forwardly therefrom in spaced parallelism. A horizontally disposed pivot rod 18 is supported in the forward end of the bracket arms 17 and extend laterally therefrom at each end of the pivot bar. One end of the pivot bar 18 extends through an adjacent position of the tube 15 as shown in Figure 4. A second tubular bar 15a has a laterally directed end 15b bolted or otherwise secured at its terminal as at 19 to the tubular bar 15 forwardly of the offset end of said bar 15. At its opposite end the bar 15a is offset laterally in an opposite direction and then continued longitudinally at 15c to extend in parallelism with the offset end 16 of the bar 15. Mounted on the offset end of the bars 15 and 15a is a suitable weight 20, each of which weight has a longitudinally extending bore substantially diamond shaped in cross section for accommodating the said ends of the bars 15 and 15a. A rack frame 22 is pivoted inwardly from one corner thereof on that end of the pivot rod 18 extending through the tube 15 and the rack frame 22 comprises an arcuate frame member 22 internally toothed as shown to advantage in Figure 1.

A bracket plate 24 is secured through the medium of any suitable fastening means 25 to one side of the post 6 above the arms 17 and the plate 24 has integrally therewith and extending therefrom a shaft 26 horizontally disposed. A cable drum 27 is rotatably mounted thereon, and this drum has integrally therewith a pinion 28 on the outer end of the shaft 26 to mesh with the teeth of the rack frame 22. Obviously, rotation of the pinion 28 will impart a vertical swinging movement to the rack frame 22. The rack frame has operative connection with the tube 15 through the medium of a substantially U-shaped vertically disposed frame 30 carried by the rack frame 22 at the forward free end thereof, the legs of which frame extend inwardly to receive therebetween the tubular bar 15. Mounted in the frame 30 is a coiled spring 31 one end of which bears against the lower leg of the frame 30, and the upper end of which bears against the bottom edge of the tube 15 for normally urging the tube upwardly against the upper horizontal legs of the frame 30. (See Figure 9).

Extending upwardly from the upper ends of the post 6 is a riser structure comprising two angle bars 32 at their upper ends being offset inwardly toward one another to terminate in parallel extensions bolted or otherwise secured together. Slightly above the top of the post 6 there is rigidly supported on the riser structure a horizontally disposed inverted U-shaped member 34 the legs of which member 34 at their free longitudinal edges are provided with inwardly directed flanges 35 so as to provide what may be termed a sleeve. Cable guide arms 36 formed of metal or any suitable material are substantially inverted U-shaped or channeled in cross section and these arms 36 at their inner ends are offset as at 37, the offset ends of said arms adapted to be telescopically received in the member 34 so that the arms 36 extend upwardly and outwardly from the member 34 in an opposite direction. Mounted in each of the arms 36 are longitudinally spaced guide pulleys 38 and a cable 39 is trained over the pulleys in one of said arms and a cable 39' is trained over the pulleys in the other of said arms, these cables at their inner ends merging into a common cable 39a wound upon the cable drum 27. The cables 39 and 39a have their free ends terminate in a loop or eye 41, each of which has a resilient operating handle 40 depending therefrom, with the result that the cable may be manually operated by one gripping the handles 40 or if desired the cables may be operated by one some distance away from the handles, as for example, the driver of a hay wagon or the like who may insert a prong or his pitch fork into the eye 41 thus operating the cables without the necessity of leaving his wagon when about to pass through the gate.

Suitable guy rods or struts 42 brace the outer ends of the arms 36, these struts 42 being secured to the ends of the arms and the upper ends of the angle bars 32 forming the riser structure.

To retain the gate in a rigid, horizontally closed position, there is provided at the forward end of the gate, suitable means to co-operate with associated means mounted on the post 5, as for example, carried by the end member 8 intermediate the upper and lower ends thereof is a latch member 43 of substantially U-shaped form, its extension legs engaging each side of the end member 8, receiving bolts 43a or the like therethrough in a manner to hold the latch member 43 rigid with the end member 8 and permit it to laterally project toward the associated means upon the gate post 5. This associate means includes a shank 44 extending through the post 5, being secured thereto through the medium of front and rear clamping nuts 45. At its forward end of the shank is bent at an upward and forward angle as at 46 to extend between the guide arms 47 which are rigidly fixed to the shank 44 at their base and extend upwardly in sidewise, spaced relation with the upturned portion 46 of the shank, adjacent the top of which, these guide arms 47 flare outward toward their upper extremities, as at 48 for to receive and guide the crown of the U-shaped, latch member 43 to engagement with the bent portion 46 of the shank as the gate is lowered to closed position.

Suitable catch means are provided for normally retaining the gate in a locked closed position, and such means includes a vertically adjustable strap plate 49 adjustably secured to the post 5, and the plate at its upper end terminates in an inwardly and upwardly directed offset extension 50. A catch co-operating with the offset extension of the plate 49 comprises a pair of link members 51 having offset intermediate portions and at one end pivoted to the laterally extending end of the pivot bolts 16 one to each side of the tube 15, while at their opposite ends these members 15 terminate in spaced parallel extensions and are secured one to each side by a bolt or any other suitable means to a catch head 52 adapted to engage to the offset 50 of the plate when the gate is in lowered or closed position as shown in Figure 1.

A wire 53 has one end thereof secured to the pivot catch and adjacent its opposite passes through a suitable guide 54 to be secured at said opposite end to the rearwardmost end of rack frame 22 as at 55. A coiled spring 56 is convoluted about the first mentioned end of the wire 53, and one end of the coil spring 56 bears against the pivoted catch, while the other end of the spring 56 bears against a guide 57 inwardly from the forward end of the tube 15 through which the wire 53 passes for normally urging the catch into that position shown in Figure 1.

The operation of the gate may be briefly explained as follows:—

By exerting a downward pull on either of the cables 39 or 39', when the gate is in a horizontal or closing position as shown in Figure 1 will, of course, rotate the drum 27, and the pinion 28 being normally engaging the rack frame 22 at the upper right hand corner of the frame as shown in Figure 5, will rotate toward the left of Figure 5 to rock the rack frame 22 toward the right of Figure 5. Upon initial movement of the rack 22 the wire 53 will be actuated for swinging the catch out of engagement with the retaining plate 49 thus releasing the gate to permit upward vertical swinging movement of the gate. When the gate is in a partially raised position the pinion will have traveled about midway of the arcuate toothed member 22' of the rack frame as shown in Figure 6, at which time the cables will be entirely unwound from the drum 27 as illustrated. The gate being in this partially opened position, the weights 20 perfectly counterbalance the tube 15. Further as is apparent, as the tube 15 continues to a vertical position the offset end of the tube and of the member 15' causes the balance to be disturbed so that the weights overpower the tube and the remaining structure of the gate with the result that the pinion 28 while rotating in the same direction causes a rewinding of the cable in an opposite direction, as the gate continues to a vertical position, and when in said vertical position the rack frame 22 and pinion 28 are in that position shown to advantage in Figure 7 whereupon the gate will remain in a vertical or opened position until such time as a downward pull is given against on one of the cables 39 or 39' whereupon the operation is reversed. When the gate is moving to a lowered position, it is obvious, that when the gate is in a partially closed position so that rack 22 and pinion 28 are in the position shown in Figure 6, the weight of the gate structure will overcome the weights 20 to complete downward movement of the gate to a closed position so that the rack frame 22 and pinion 28 assume that position as shown in Figure 5 or the original position. When the gate is swung downwardly in this manner the latch member 43 is received into the flared extremities of the guide arms 47, which guide the crown of the U-shaped latch to snug engagement over the upturned end 46 of the shank member 44 in a manner that the gate is held rigid and free from play. A pivoted catch member under action of the spring 56 will be moved into engagement with the offset end of the plate 47 for latching the gate in closed position.

It is thought that from the foregoing description, taken in connection with the accompanying drawings a clear understanding of the operation, structure, utility and advantages of an invention of this character will be had by those skilled in the art without a more detailed description.

Even though I have herein shown and described the preferred embodiment of my invention, it is to be understood that the same is susceptible to changes fully comprehended by the spirit of the invention as herein described, and the scope of the appended claims.

Having thus described my invention what I wish to claim as new is:—

1. In a gate structure, the combination of a post, a gate pivoted at one end to said post, an elongated bar pivoted at one end to the free end of said gate, means for pivotally connecting said bar inwardly from its opposite end to said post, a weight on the last mentioned end of said bar, a rack frame including an arcuate member provided with teeth, said rack frame being pivotally mounted on said post, a horizontally disposed shaft mounted on said post extending laterally therefrom, a drum rotatably mounted on said shaft, a pinion formed integrally with said drum and meshing with the teeth of said arcuate frame member and a cable wound on said drum whereby when said cable is actuated said pinion will be rotated for actuating said rack frame and means operatively connecting said rack frame with said bar for rocking said bar about its pivot whereby said gate may be swung to an opened or closed position.

2. In a gate structure, the combination of a post, a gate pivoted at one end to said post, an elongated bar pivoted at one end to the free end of said gate, means for pivotally connecting said bar inwardly from its opposite end to said post, a weight on the last mentioned end of said bar, a rack frame including an arcuate member provided with teeth, said rack frame being pivotally mounted on said post, a horizontally disposed shaft mounted on said post extending laterally therefrom, a drum rotatably mounted on said shaft, a pinion formed integrally with said drum and meshing with the teeth of said arcuate frame member, and a cable wound on said drum whereby when said cable is actuated said pinion will be rotated for actuating said rack frame, and means operatively connecting said rack frame with said bar for rocking said bar about its pivot whereby said gate may be swung to an opened or closed position, and said cable being of such a length as to be entirely unwound from said drum when said bar is substantially midway between a horizontal and vertical position, so as to be rewound on said drum in the opposite direction as the said weight and the weight of the gate continue to move the gate in one direction to an opened or closed position.

3. In a gate structure, the combination of a post, a gate pivoted at one end to said post, an elongated bar pivoted at one end to the free end of said gate, means pivotally connecting said bar inwardly from its opposite end to said post, a weight on the last mentioned end of said bar, a rack frame including an arcuate member provided with teeth, said rack frame being pivotally mounted on said post, a horizontally disposed shaft mounted on said post extending laterally therefrom, a drum rotatably mounted on said shaft, a pinion formed integrally with said drum and meshing with the teeth of said arcuate frame member, and a cable wound on said drum whereby when said cable is actuated said pinion will be rotated for actuating said rack frame, and means operatively connecting said rack frame with said bar for rocking said bar about its pivot whereby said gate may be swung to an opened or closed position, and said cable being of such a length as to be entirely unwound from said drum when said bar is substantially midway between a horizontal and vertical position so as to be rewound on said drum in the opposite direction as the weight and the weight of the gate continue to move the gate in one direction to an opened or closed position, and means for supporting the free ends of said cable in position whereby the latter may be actuated for initially rotating said drum.

4. In a gate structure, the combination of a post, a gate pivoted at one end to said post, an elongated bar pivoted at one end to the free end of said gate, means for pivotally connecting said bar inwardly from its opposite end to said post, a weight on the last mentioned end of said bar, a rack frame including an arcuate member provided with teeth, said rack frame being pivotally mounted on said post, a horizontally disposed shaft mounted on said post extending laterally therefrom, a drum rotatably mounted on said shaft, a pinion formed integrally with said drum and meshing with the teeth of said arcuate frame member, a cable wound on said drum whereby when said cable is actuated said pinion will be rotated for actuating said rack frame, means operatively connecting rack frame with said bar for rocking said bar about its pivot whereby said gate may be swung to an opened or closed position, said cable being of such a length as to be entirely unwound from said drum when said bar is substantially midway between a horizontal and vertical position so as to be rewound on said drum in the opposite direction as the said weight and the weight of the gate continue to move the gate in one direction to an opened or closed position, means for supporting the free ends of said cable in position whereby the latter may be actuated for initially rotating said drum, and means for normally maintaining said gate in a closed position, said last mentioned means including means for operatively connecting the same with the rack frame for releasing said gate retaining means upon initial movement of said rack frame when the gate is in a closed position.

5. In a gate structure, the combination of a post, a gate pivoted at one end to said post, an elongated bar pivoted at one end to the free end of said gate, means pivotally connecting said bar to said post inwardly from its opposite end, a weight on the last mentioned end of said bar, an arcuate rack frame pivotally mounted on said post and connected with said bar, a pinion meshing with the teeth of said rack frame, a rotatable drum connected with said pinion, and a cable wound on said drum, whereby when said cable is actuated said pinion will be rotated for actuating said rack frame to rock said bar about its pivot, said cable being of such length as to be entirely unwound from said drum when said bar is substantially midway between a horizontal and vertical position, whereby said cable will be rewound on said drum in the opposite direction, as the bar continues to move in the same direction under the action of said weight or the weight of the gate.

In testimony whereof I affix my signture.

MATHIAS FLECK.